(12) United States Patent
Chang et al.

(10) Patent No.: US 10,484,290 B2
(45) Date of Patent: Nov. 19, 2019

(54) BRIDGE MODULE AND DATA TRANSMISSION METHOD

(71) Applicant: ASMedia Technology Inc., New Taipei (TW)

(72) Inventors: Wei-Kao Chang, New Taipei (TW); Chun-Chih Tai, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/660,987

(22) Filed: Jul. 27, 2017

(65) Prior Publication Data

US 2018/0048580 A1    Feb. 15, 2018

(30) Foreign Application Priority Data

Aug. 11, 2016   (TW) .............................. 105125620 A

(51) Int. Cl.
*H04L 12/825* (2013.01)
*H04L 12/26* (2006.01)

(52) U.S. Cl.
CPC .......... *H04L 47/25* (2013.01); *H04L 43/0894* (2013.01)

(58) Field of Classification Search
CPC ..... H04L 47/25; H04L 43/0894; H04L 45/18; H04L 45/48
See application file for complete search history.

(56) References Cited

U.S. PATENT DOCUMENTS

| | | | |
|---|---|---|---|
| 2008/0192660 A1* | 8/2008 | Li | H04W 72/087 370/294 |
| 2008/0285502 A1* | 11/2008 | Deng | H04B 7/155 370/315 |
| 2012/0089755 A1 | 4/2012 | Shiu et al. | |
| 2014/0010213 A1* | 1/2014 | Wang | H04W 4/70 370/336 |
| 2015/0296527 A1* | 10/2015 | Ranson | H04W 88/085 370/329 |
| 2016/0242195 A1* | 8/2016 | Kwon | H04W 72/121 |
| 2017/0048048 A1* | 2/2017 | Seok | H04L 5/0055 |
| 2017/0150493 A1* | 5/2017 | Seok | H04B 7/0452 |
| 2018/0019950 A1* | 1/2018 | Hosn | H04L 47/25 |
| 2018/0302898 A1* | 10/2018 | Su | H04B 7/0473 |
| 2019/0045536 A1* | 2/2019 | Gao | H04B 7/0626 |

FOREIGN PATENT DOCUMENTS

| | | |
|---|---|---|
| CN | 103139088 A | 6/2013 |
| CN | 104901920 A | 9/2015 |
| TW | 201216077 A | 4/2012 |
| TW | 201415237 A | 4/2014 |

* cited by examiner

*Primary Examiner* — Khaled M Kassim
*Assistant Examiner* — Syed Ali
(74) *Attorney, Agent, or Firm* — CKC & Partners Co., LLC

(57) ABSTRACT

A bridge module is provided. The bridge module comprises a first transmission unit electrically connected to a host to transfer data with the host at an uplink data transmission rate; a second transmission unit electrically connected to a data transmission device to transfer data with the data transmission device at a downlink data transmission rate; and a processing device configured to adjust the downlink data transmission rate according to the uplink data transmission rate. A data transmission method is also provided.

8 Claims, 3 Drawing Sheets

BRIDGE MODULE AND DATA TRANSMISSION METHOD

CROSS-REFERENCE TO RELATED APPLICATION

This application claims the priority benefit of Taiwan application serial No. 105125620, filed on Aug. 11, 2016. The entirety of the above-mentioned patent application is hereby incorporated by references herein and made a part of specification.

BACKGROUND OF THE INVENTION

Field of the Invention

The disclosure relates to a bridge module and a data transmission method.

Description of the Related Art

With the development of science and technology, bridge modules are widely used in people's life. The bridge module is bridged between a host and a data transmission device to exchange data between the host and the data transmission device. However, the transmission rate of the bridge module is currently low, and the power consumption is increased when the data is exchanged between the host and the data transmission device by the bridge module.

BRIEF SUMMARY OF THE INVENTION

According to an aspect of the disclosure, a bridge module is provided. The bridge module comprises: a first transmission unit electrically connected to a host to transfer data with the host at an uplink data transmission rate; a second transmission unit electrically connected to a data transmission device to transfer data with the data transmission device at a downlink data transmission rate; and a processing device configured to adjust the downlink data transmission rate according to the uplink data transmission rate.

According another aspect of the disclosure, a data transmission method is provided. The data transmission method comprises: transferring data with a host via a first transmission unit at an uplink data transmission rate; transferring data with a data transmission device via a second transmission unit at a downlink data transmission rate; and adjusting the downlink data transmission rate according to the uplink data transmission rate.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Details of the disclosure are described hereinafter accompanying with the figures. After reading the disclosure, any persons having ordinary skill in the art may make various modifications and changes to the disclosure without departing from the scope of the disclosure.

Figure 1:
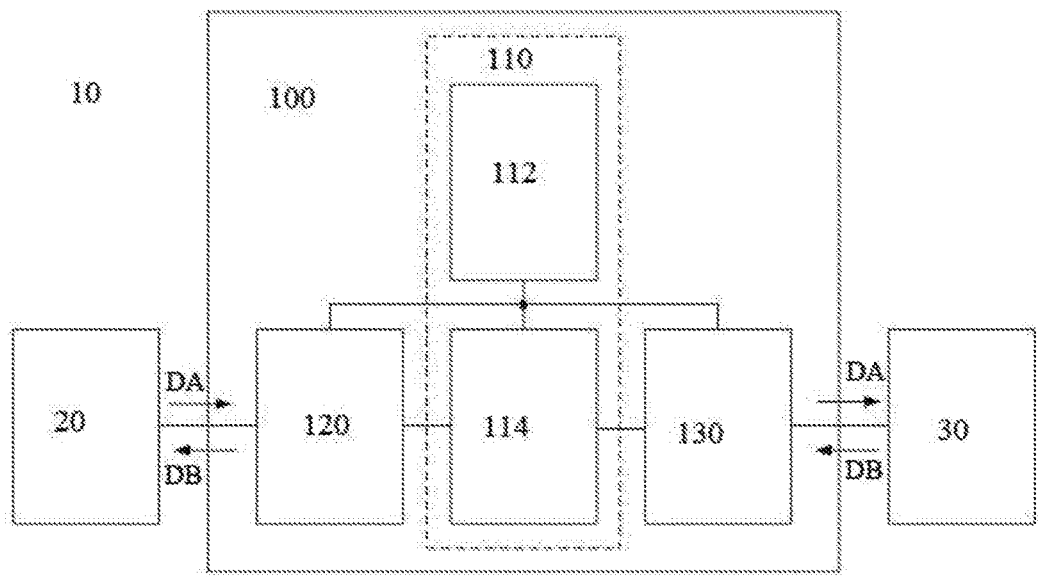
FIG. 1 is a schematic diagram showing a data transmission system in an embodiment.

FIG. 1 is a schematic diagram showing a data transmission system 10 in an embodiment. In an embodiment, a data transmission system 10 includes a bridge module 100, a host 20, and a data transceiver 30. The bridge module 100 is electrically connected between the host 20 and the data transceiver 30. Data is exchanged between the host 20 and the data transceiver 30 via the bridge module 100. In an embodiment, the bridge module 100 transfers the data DA from the host 20 to the data transceiver 30, and transfers the data DB from the data transceiver 30 to the host 20.

In the embodiment, the bridge module 100 includes a processing device 110, a first transmission unit 120, and a second transmission unit 130. The processing device 110 is electrically connected to the first transmission unit 120 and the second transmission unit 130.

In the embodiment, the first transmission unit 120 is electrically connected to the host 20 to receive the data DA from the host 20 and to transfer the data DB to the host 20. In an embodiment, the first transmission unit 120 is a USB transmission unit, a PCIe transmission unit or a SATA transmission unit, which is not limited herein.

In the embodiment, the second transmission unit 130 is electrically connected to the data transceiver 30 to receive the data DB from the data transceiver 30 and to transfer the data DA to the data transceiver 30. In an embodiment, the second transmission unit 130 is a SATA transmission unit, a PCIe transmission unit, or a USB transmission unit, which is not limited herein.

The transmission protocols for the first transmission unit 120 and the second transmission unit 130 are the same or different in embodiments. In an embodiment, the first transmission unit 120 is a USB transmission unit, and the second transmission unit 130 is a SATA transmission unit. In an embodiment, both the first transmission unit 120 and the second transmission unit 130 are PCIe transmission units.

In the embodiment, the processing device 110 includes a processor 112 and a data exchange unit 114. The processor 112 is configured to control the first transmission unit 120 and the second transmission unit 130 to exchange the data via the data exchange unit 114. In an embodiment, the processor 112 is a central processing unit (CPU), a microprocessor, or other computing units, which is not limited herein. In an embodiment, the data exchange unit 114 is a direct memory access unit, which is not limited herein. The data exchange is speeded up by using the data exchange unit 114.

In an embodiment, the data is exchanged between the first transmission unit 120 and the host 20 at an uplink data transmission rate, and the data is exchanged between the second transmission unit 130 and the data transceiver 30 at a downlink data transmission rate. The downlink data transmission rate is adjusted by the processing device 110 according to the uplink data transmission rate. Consequently, the downlink data transmission rate would be not too higher than the uplink data transmission rate (for example, the uplink data transmission rate is 5 GHz, and the downlink data transmission rate is 6 GHz, which results a waste of resources and low efficiency of data exchange).

Figure 2:
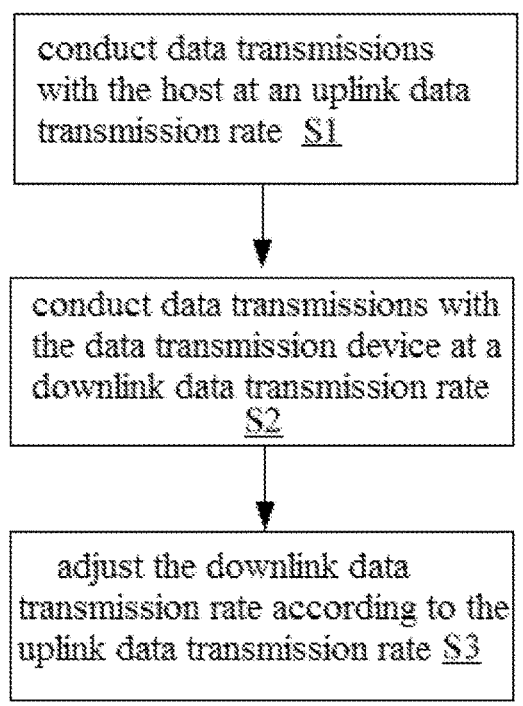
FIG. 2 is a flow chart of a data transmission method for a bridge module in an embodiment.

FIG. 2 is a flow chart of a data transmission method 200 for a bridge module in an embodiment. A data transmission method 200 is applied to a bridge module that is the same or similar to the bridge module in FIG. 1. For better understanding, in an embodiment, the data transmission method is described in combination with the bridge module 100 shown in FIG. 1.

Unless mentioned otherwise, the sequence of the steps of the data transmission method in the embodiment can be determined according to the requirements. In an embodiment, all/partial of the steps of the data transmission method can be executed simultaneously. In embodiments, the steps are adaptively added, replaced and/or omitted.

In the embodiment, the data transmission method 200 includes following steps.

In step S1, the processing device 110 has data transmissions with the host 20 via the first transmission unit 120 at an uplink data transmission rate.

In an embodiment, the data transmission between the first transmission unit 120 and the host 20 conforms to the USB3.0 protocol, and the uplink data transmission rate is 5 GHz. In an embodiment, the uplink data transmission rate and the transmission protocol for the data transmission between the first transmission unit 120 and the host 20 are determined by the host 20.

In step S2, the processing device 110 has data transmissions with the data transceiver 30 via the second transmission unit 130 at a downlink data transmission rate.

In an embodiment, there are a plurality of predetermined downlink data transmission rates, such as 6 GHz (which corresponds to SATA3 protocol), 3 GHz (which corresponds to SATA2 protocol), and 1.5 GHz (which corresponds to SATA1 protocol). The processing device 110 selects one of the predetermined downlink data transmission rate as the downlink data transmission rate.

In an embodiment, the processing device 110 selects the highest predetermined downlink data transmission rate as the downlink data transmission rate. In this case, the data transmission between the second transmission unit 130 and the data transceiver 30 is based on the SATA3 protocol, and the downlink data transmission rate is 6 GHz. The ways of determining the downlink data transmission rate are various, which is not limited herein.

In an embodiment, the value of a register of the second transmission unit 130 is set by the processing device 110 to set the transmission protocol and the downlink data transmission rate.

In step S3, the downlink data transmission rate is adjusted by the processing device 110 according to the uplink data transmission rate. In an embodiment, the processing device 110 adjusts the downlink data transmission rate to be 3 GHz by changing the protocol for the data transmission between the second transmission unit 130 and the data transceiver 30 to be the SATA2 protocol according to the uplink data transmission rate. In an embodiment, the downlink data transmission rate is adjusted to the same as or lower than the uplink data transmission rate, which is not limited herein.

In an embodiment, the processing device 110 selects one of the predetermined downlink data transmission rates as the adjusted downlink data transmission rate. In an embodiment, the selected downlink data transmission rate is the highest one of the predetermined downlink data transmission rates that are lower than the uplink data transmission rate. In an embodiment, when the uplink data transmission rate is 5 GHz, the processing device 110 selects 3 GHz among the predetermined downlink data transmission rate of 6 GHz, 3 GHz and 1.5 GHz as the adjusted downlink data transmission rate, and selects the SATA2 protocol for the data transmission.

In an embodiment, when the uplink data transmission rate is higher than all the predetermined downlink data transmission rates, the processing device 110 selects the highest predetermined downlink data transmission rate as the downlink data transmission rate. In an embodiment, when the uplink data transmission rate is 10 GHz (which corresponds to USB3.1 protocol), the downlink data transmission rate is kept at 6 GHz and conforms to the SATA3 protocol.

In an embodiment, when the uplink data transmission rate is lower than all of the predetermined downlink data transmission rates, the processing device 110 selects the lowest one of the predetermined downlink data transmission rates as the adjusted downlink data transmission rate. In an embodiment, when the uplink data transmission rate is 480 MHz (which corresponds to USB2.0 protocol, for example), the processing device 110 selects 1.5 GHz among the predetermined downlink data transmission rates of 6 GHz, 3 GHz, and 1.5 GHz as the adjusted downlink data transmission rate, and selects the SATA1 protocol for the data transmission.

The ways of adjusting the downlink data transmission rate are various, which is not limited herein. In such a way, the power consumption of the bridge module 100 is reduced.

In an embodiment, the processor 112 of the processing device 110 has a processor frequency. The first transmission unit 120, the second transmission unit 130, and the data exchange unit 114 are controlled by the processor 112 to exchange the data according to the processor frequency. In an embodiment, the processor frequency is adjusted by the processing device according to the uplink data transmission rate.

In an embodiment, there are a plurality of predetermined processor frequencies. In an embodiment, the processor frequency is 156.25 MHz, 125 MHz, or 30 MHz. The processing device 110 selects one of the predetermined processor frequencies as a preset processor frequency, and selects a lower one of the predetermined processor frequencies as the adjusted processor frequency according to the uplink data transmission rate. In an embodiment, the preset processor frequency is 156.25 MHz, and the adjusted processor frequency is 125 MHz.

In an embodiment, the value of a register of the processing device 110 is configured to set the processor frequency. In such a way, when a high-speed processing is not necessary, the processor frequency is adjusted according to the uplink data transmission rate to reduce the power consumption.

In an embodiment, the corresponding relationship between the uplink data transmission rate and the processor frequency is pre-established in a look-up table. The processing device 110 selects a proper processor frequency from the look-up table as the adjusted processor frequency according to the uplink data transmission rate. In an embodiment, the proper processor frequency is calculated according to the uplink data transmission rate, which is not limited herein.

Figure 3:
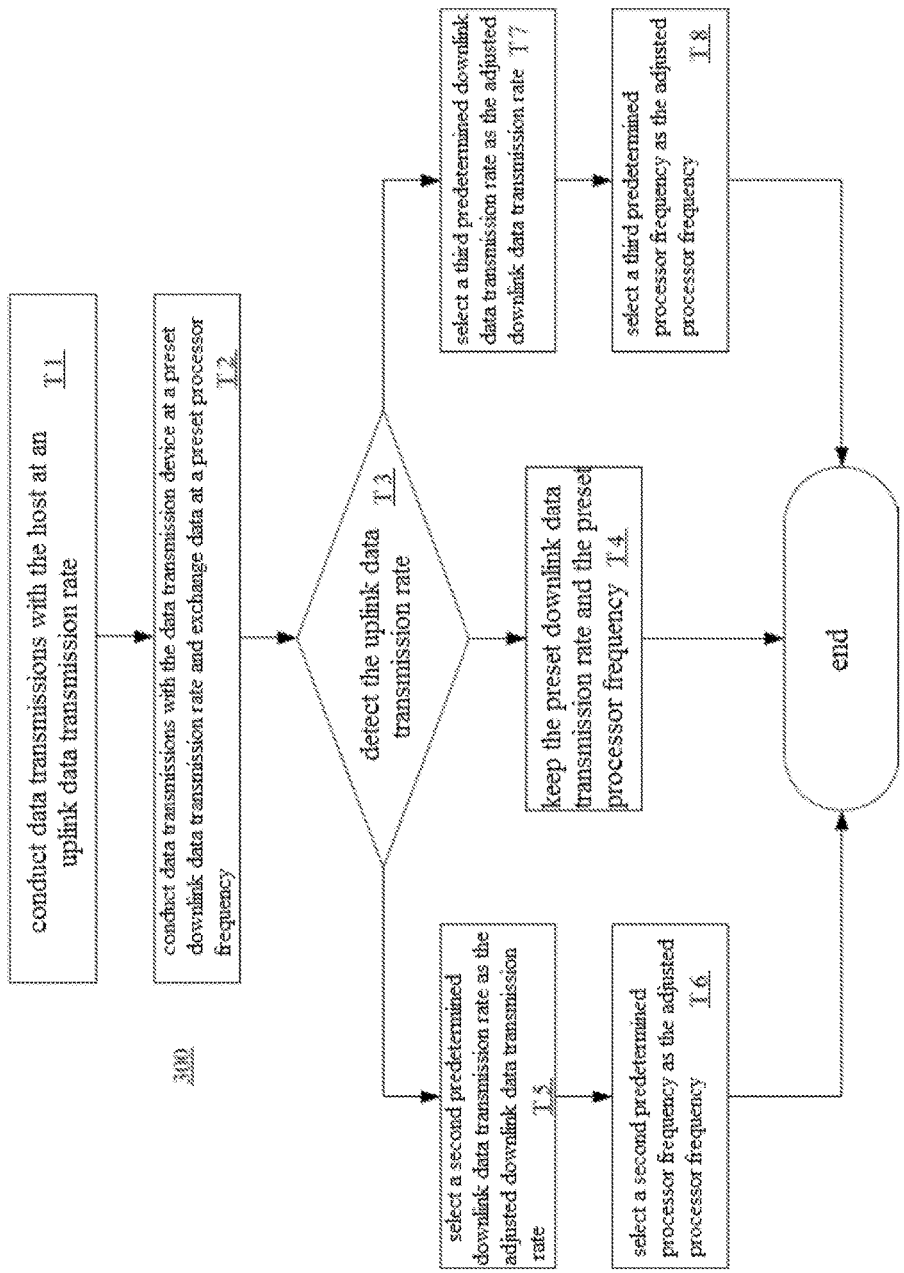
FIG. 3 is a flow chart of a data transmission method for a bridge module in an embodiment.

FIG. 3 is a flow chart of a data transmission method 300 for a bridge module in an embodiment. A data transmission method 300 is applied to a bridge module that is the same or similar to the bridge module in FIG. 1. For better understanding, in an embodiment, the data transmission method is described in combination with the bridge module 100 shown in FIG. 1.

Unless mentioned otherwise, the sequence of the steps of the data transmission method in the embodiment is determined according to the requirements. In an embodiment, all/partial of the steps of the data transmission method are executed simultaneously. In embodiments, the steps are adaptively added, replaced and/or omitted.

In the embodiment, the data transmission method 300 includes following steps.

In step T1, the processing device 110 has data transmissions with the host 20 via the first transmission unit 120 at an uplink data transmission rate. Details for the step can be refer to the step S1, which is not repeated herein.

In step T2, the processing device 110 has data transmissions with the data transceiver 30 via the second transmission unit 130 at a preset downlink data transmission rate. In an embodiment, the processor 112 of the processing device 110 is configured to control the first transmission unit 120 and the second transmission unit 130 to exchange data via the data exchange unit 114 at a preset processor frequency.

In an embodiment, the processing device 110 selects one of the predetermined downlink data transmission rates as the preset downlink data transmission rate. In an embodiment, the processing device 110 selects the highest one (6 GHz) of the predetermined downlink data transmission rates as the preset downlink data transmission rate.

In an embodiment, the processing device 110 selects one of the predetermined processor frequencies as the preset processor frequency. In an embodiment, the processing device 110 selects the highest one (that is, 156.25 MHz) of the predetermined processor frequencies as the preset processor frequency.

In step T3, the processing device 110 is configured to detect the uplink data transmission rate. The processing device 110 determines whether needs to adjust the downlink data transmission rate and the processor frequency to determine the adjusted downlink data transmission rate and the processor frequency according to the uplink data transmission rate.

In step T4, when the uplink data transmission rate is a first predetermined uplink data transmission rate (such as 10 GHz), the preset downlink data transmission rate (such as 6 GHz) and the preset processor frequency (such as 156.25 MHz) is kept by the processing device 110.

In step T5, when the uplink data transmission rate is a second predetermined uplink data transmission rate (such as 480 MHz), the processing device 110 selects a second predetermined downlink data transmission rate (such as 1.5 GHz) from the predetermined downlink data transmission rates as the adjusted downlink data transmission rate according to the uplink data transmission rate. The selection of the adjusted downlink data transmission rate can refer to the step S3, which is not repeated herein.

Then, in step T6, the processing device 110 selects a second predetermined processor frequency (such as 30 MHz) from the predetermined processor frequencies as the adjusted processor frequency according to the uplink data transmission rate. The selection of the adjusted processor frequency can refer to above related paragraphs, which is not repeated herein.

In step T7, when the uplink data transmission rate is a third predetermined uplink data transmission rate (such as 5 GHz), the processing device 110 selects a third predetermined downlink data transmission rate (such as 3 GHz) from the predetermined downlink data transmission rates as the adjusted downlink data transmission rate according to the uplink data transmission rate. The selection of the adjusted downlink data transmission rate can refer to the step S3, which is not repeated herein.

Then, in step T8, the processing device 110 selects a third predetermined processor frequency (such as 125 MHz) from the predetermined processor frequencies as the adjusted processor frequency according to the uplink data transmission rate. The determination of the adjusted processor frequency can refer to the related paragraph, which is not limited herein.

In sum, in embodiments, the downlink data transmission rate and the processor frequency are adjusted according to the uplink data transmission rate to reduce the power consumption.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A bridge module configured to establish a bridge communication between a host and a data transceiver, the bridge module comprising:
    a first transmission interface electrically connected to the host, configured to transfer data with the host at an uplink data transmission rate from the first transmission interface to the host;
    a second transmission interface electrically connected to the data transceiver, configured to transfer data with the data transceiver at a downlink data transmission rate from the second transmission interface to the data transceiver; and
    a processing device configured to adjust the downlink data transmission rate according to the uplink data transmission rate by selecting one of a plurality of predetermined downlink data transmission rates as the adjusted downlink data transmission rate, wherein the selected downlink data transmission rate is the highest one of the predetermined downlink data transmission rates that are lower than the uplink data transmission rate;
    wherein the processing device is configured to adjust a processor frequency of the processing device according to the uplink data transmission rate by selecting one of predetermined processor frequencies as the adjusted processor frequency.

2. The bridge module according to claim 1, wherein the first transmission interface is a USB transmission interface, a PCIe transmission interface or a SATA transmission interface.

3. The bridge module according to claim 1, wherein the second transmission interface is a USB transmission interface, a PCIe transmission interface or a SATA transmission interface.

4. A data transmission method comprising:
    establishing a bridge communication between a host and a data transceiver by a bridge module;
    electrically connecting a first transmission interface of the bridge module to the host, and transmitting data with a host via the first transmission interface at an uplink data transmission rate from the first transmission interface to the host;
    electrically connecting a second transmission interface of the bridge module to the data transceiver, and transmitting data with a data transceiver via the second transmission interface at a downlink data transmission rate from the second transmission interface to the data transceiver;
    adjusting the downlink data transmission rate according to the uplink data transmission rate by selecting one of predetermined downlink data transmission rates as the adjusted downlink data transmission rate, wherein the selected downlink data transmission rate is the highest one of the predetermined downlink data transmission rates that are lower than the uplink data transmission rate; and adjusting a processor frequency according to the uplink data transmission rate by selecting one of predetermined processor frequencies as the adjusted processor frequency.

5. The data transmission method according to claim 4, further comprising:

selecting another one of the predetermined processor frequencies as a preset processor frequency, wherein the preset processor frequency is higher than the adjusted processor frequency.

6. A data transmission system, comprising:

a host;

a data transceiver; and a bridge module configured to establish a bridge communication between the host and the data transceiver, the bridge module comprising:

a first transmission interface electrically connected to the host, configured to transfer data with the host at an uplink data transmission rate from the first transmission interface to the host;

a second transmission interface electrically connected to the data transceiver, configured to transfer data with the data transceiver at a downlink data transmission rate from the second transmission interface to the data transceiver; and a processing device configured to adjust the downlink data transmission rate according to the uplink data transmission rate by selecting one of a plurality of predetermined downlink data transmission rates as the adjusted downlink data transmission rate, wherein the selected downlink data transmission rate is the highest one of the predetermined downlink data transmission rates that are lower than the uplink data transmission rate;

wherein the processing device is configured to adjust a processor frequency of the processing device according to the uplink data transmission rate by selecting one of predetermined processor frequencies as the adjusted processor frequency.

7. The data transmission system according to claim 6, wherein the first transmission interface is a USB transmission interface, a PCIe transmission interface or a SATA transmission interface.

8. The data transmission system according to claim 6, wherein the second transmission interface is a USB transmission interface, a PCIe transmission interface or a SATA transmission interface.

* * * * *